United States Patent
Hunter (10) Patent No.: US 9,281,868 B2
(45) Date of Patent: Mar. 8, 2016

(54) POWER LINE COMMUNICATIONS ZONING DEVICE

(71) Applicant: WireFi Networks, Inc., Santa Barbara, CA (US)

(72) Inventor: David Hunter, Santa Barbara, CA (US)

(73) Assignee: WireFi Networks, Inc., Santa Barbara, CA (US)

( * ) Notice: Subject to any disclaimer, the term of this patent is extended or adjusted under 35 U.S.C. 154(b) by 0 days.

(21) Appl. No.: 14/289,485

(22) Filed: May 28, 2014

(65) Prior Publication Data

US 2015/0349846 A1 Dec. 3, 2015

(51) Int. Cl.
*H04B 3/00* (2006.01)
*H04B 3/56* (2006.01)

(52) U.S. Cl.
CPC ...................................... *H04B 3/56* (2013.01)

(58) Field of Classification Search
CPC .... H04B 3/56; H04B 3/54; H04B 2203/5441; H04B 2203/5491; H04B 2203/5445; H04B 3/542; H04B 2203/5487; H04B 2203/5408; H04B 3/548; H04L 67/42; H04L 12/2838; H04L 12/2801; H04L 29/12254
USPC .......... 375/257, 260, 259; 370/463, 475, 389; 340/538, 12.32, 12.3, 538.12, 854.9
See application file for complete search history.

(56) References Cited

U.S. PATENT DOCUMENTS

| | | | |
|---|---|---|---|
| 6,947,736 B2 | 9/2005 | Shaver et al. | |
| 7,064,654 B2* | 6/2006 | Berkman et al. | 375/259 |
| 7,437,140 B2 | 10/2008 | Iwamura | |
| 7,463,877 B2 | 12/2008 | Iwamura | |
| 2003/0224784 A1 | 12/2003 | Hunt et al. | |
| 2005/0013307 A1 | 1/2005 | Park | |
| 2005/0015805 A1 | 1/2005 | Iwamura | |
| 2005/0063355 A1 | 3/2005 | Iwamura | |
| 2006/0145535 A1* | 7/2006 | Kaneko | 307/1 |
| 2006/0165054 A1* | 7/2006 | Iwamura | 370/351 |
| 2014/0129892 A1* | 5/2014 | Magin et al. | 714/746 |

OTHER PUBLICATIONS

Anonymous, HomePlug AV White Paper, HomePlug® Powerline Alliance, Inc., 2005, 11 total pages.

* cited by examiner

*Primary Examiner* — Rahel Guarino
(74) *Attorney, Agent, or Firm* — SoCal IP Law Gorup LLP; John E. Gunther; Steven C. Sereboff (57) ABSTRACT

A power line communications (PLC) network zoning device may include a housing, a power cord extending from the housing, and a plurality of power outlets mounted on the housing, the plurality of power outlets coupled to internal power lines within the housing. An isolation device disposed within the housing may transmit electrical power from the power cord to the internal power lines while isolating PLC communications traffic on the internal power lines from PLC communications traffic on the power cord. A bypass device internal to the housing may selectively transfer PLC communications traffic between the internal power lines and the power cord bypassing the isolation device.

7 Claims, 7 Drawing Sheets

POWER LINE COMMUNICATIONS ZONING DEVICE

NOTICE OF COPYRIGHTS AND TRADE DRESS

A portion of the disclosure of this patent document contains material that is subject to copyright protection. This patent document may show and/or describe matter that is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to local area networks using power line communications.

2. Description of the Related Art

A variety of communications media and standards is available for use in network communications. In this patent, the term "communications medium" means any medium for conveying or transmitting information-bearing waveforms or signals. Communications media include electrical wires, coaxial cables, optical fibers, and wireless communications using radio-frequency, optical, or acoustic carrier waves. An emerging technology for network communications is power line communications (PLC), which may operate in accordance with standards such as IEEE Std 1901-2010 or the International Telecommunications Union ITU-T G.hn standard. ITU-T G.hn is also a standard for phone line communications and communications over TV cable.

PLC may be used for communications between equipment powered from the same power system. For example, home computer systems and home entertainment systems are typically composed of several hardware units interconnected by numerous data cables, such as USB (universal serial bus) cables, Ethernet cables, HDMI (High-Definition Multimedia Interface) cables, audio cables, and/or video cables. Such systems typically have a power cord connecting each unit to an AC power outlet. PLC offers the potential for such equipment to communicate via their power cords and the AC home wiring, eliminating or greatly reducing the number of data cables. The application of PLC is not limited to home electronics systems or even AC power lines.

PLC functions by superimposing a high frequency data signal on the low frequency (typically 50 or 60 Hz) power line. A data signal placed on the power line by one unit may be present everywhere within the same power distribution circuit. Thus the communications bandwidth of the power distribution circuit must be shared by various units. This sharing may lead to reduced performance or inter-unit interference if many units operate from the same power distribution circuit.

Throughout this description, elements appearing in figures are assigned three-digit reference designators, where the most significant digit is the number of the figure in which the element is introduced. An element that is not described in conjunction with a figure may be presumed to have the same characteristics and function as a previously-described element that has the same reference designator.

DETAILED DESCRIPTION

Description of Apparatus

Figure 1:
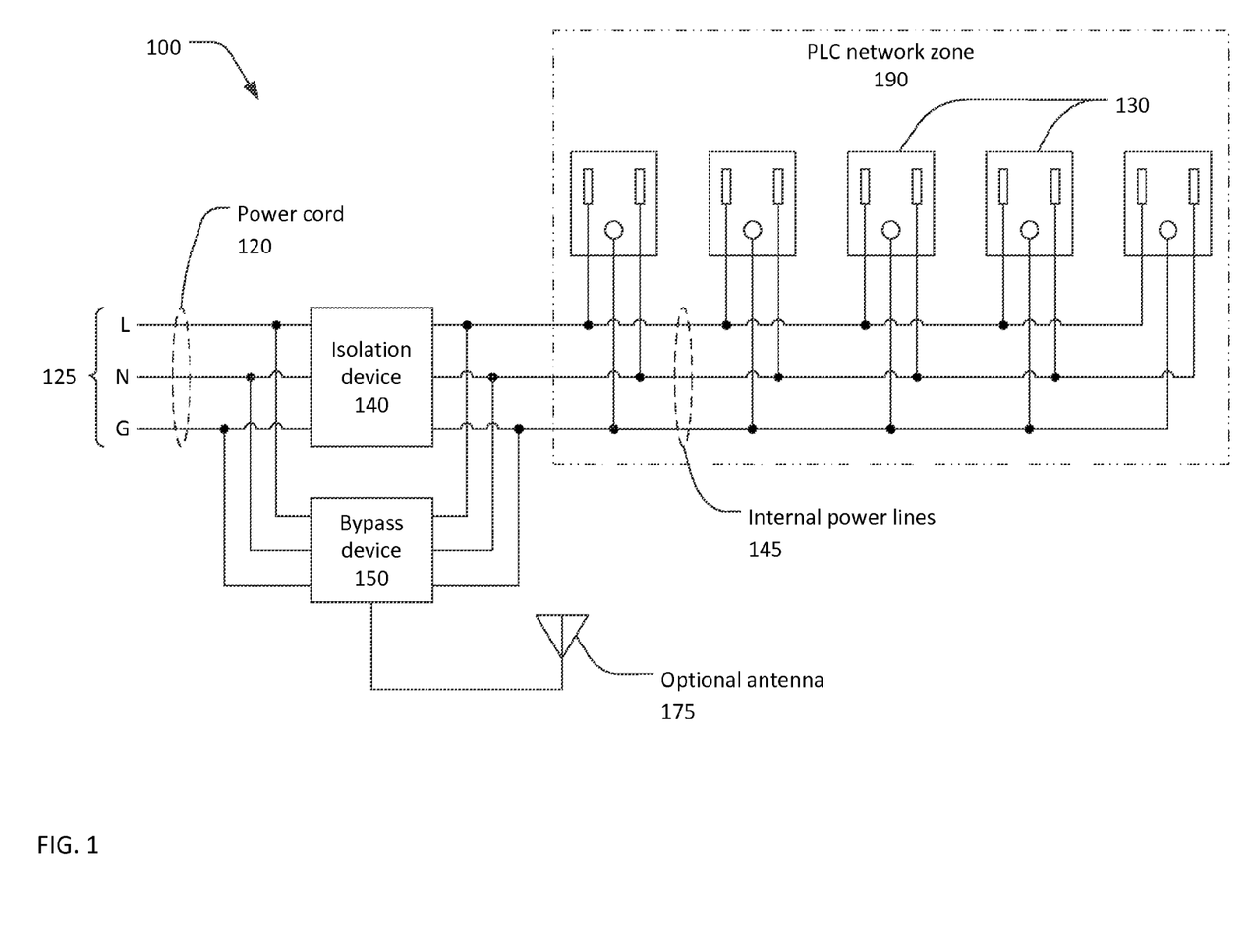
FIG. 1 is a block diagram of a PLC zoning device.

Referring now to FIG. 1, a PLC zoning device 100 may be used to partition a power distribution network into multiple PLC network zones or sub-networks. The PLC zoning device 100 may include a power cord 120 that connects to external power lines 125, an isolation device 140, a set of internal power lines 145 connected to multiple power outlets 130, and a bypass device 150. The power cord 120 may include conventional line (L), neutral (N), and ground (G) conductors. The power cord 120 and the external power lines 125 may carry PLC communications signals on the line and neutral conductors. Future PLC communications standards, such as the HomePlug® AV2 standard, may carry PLC communications signals on any or all of the line-neutral, line-ground, and neutral-ground conductor pairs.

In the example of FIG. 1, the power distribution network provides single-phase alternating current (AC) power. A PLC zoning device may also be used in a direct current (DC) power distribution system.

The conductors of the power cord 120 may be coupled to corresponding internal power lines 145 through the isolation device 140. The isolation device 140 may allow low frequency alternating current (AC) power or direct current (DC) power to pass from the power cord 120 to the internal power lines 145 without significant attenuation. At the same time, the isolation device 140 may block higher frequency PLC communications signals from passing between the power cord 120 and the internal power lines 145. The isolation device 140 may be, for example, a low pass filter or a band pass filter. The internal power lines 145, the power outlets 130, and devices (not shown) connected to the power outlets 130 form an isolated PLC network zone 190. Communications in the PLC network zone 190 may be isolated from the power cord 120 and the power distribution system to which the power cord 120 is connected. Isolating the PLC network zone 190 from the power distribution system may prevent interference from other PLC network zones that may share the same power distribution system. Isolating the PLC network zone 190 further allows the full bandwidth of the PLC network to be used for communications between devices plugged into the power outlets 130.

The PLC zoning device 190 may optionally include one or more additional power outlets (not shown) connected to the power cord 120 before the isolation device 140. Devices connected to the additional power outlets would not be within the PLC network zone 190.

The bypass device 150 may allow selective communications between devices in the PLC network zone 190 and devices external to the PLC network zone 190. The bypass device 150 may discover one or more addresses, such as a MAC (medium access control) address or IP (Internet protocol) address, for each device in the PLC network zone 190, which is to say each device connected to any of the power outlets 130. The bypass device 150 may monitor communications traffic arriving on the power cord 120. When the communications traffic arriving on the power cord 120 includes communications traffic addressed specifically to a device in the PLC network zone 190, the bypass device 150 may forward the network traffic to the destination device, bypassing the isolation device 140.

Similarly, the bypass device 150 may monitor communications traffic on the internal power lines 145. When the bypass device 150 detects communications traffic addressed to a device outside of the PLC network zone 190, the bypass device 150 may forward the network traffic to the destination device over the power cord 120, again bypassing the isolation device 140.

The bypass device 150 may optionally also function as a controller for the PLC network zone 190. The bypass device 150 may include an antenna 175 for communication with a wireless local area network, such as a Wi-Fi® network or a network in accordance with Institute of Electrical and Electronic Engineers (IEEE) Std 802.11. The bypass device 150 may function as an interface between the PLC network zone 190 and the wireless local area network. The bypass device 150 may also function as a controller for the wireless local area network.

Figure 2:
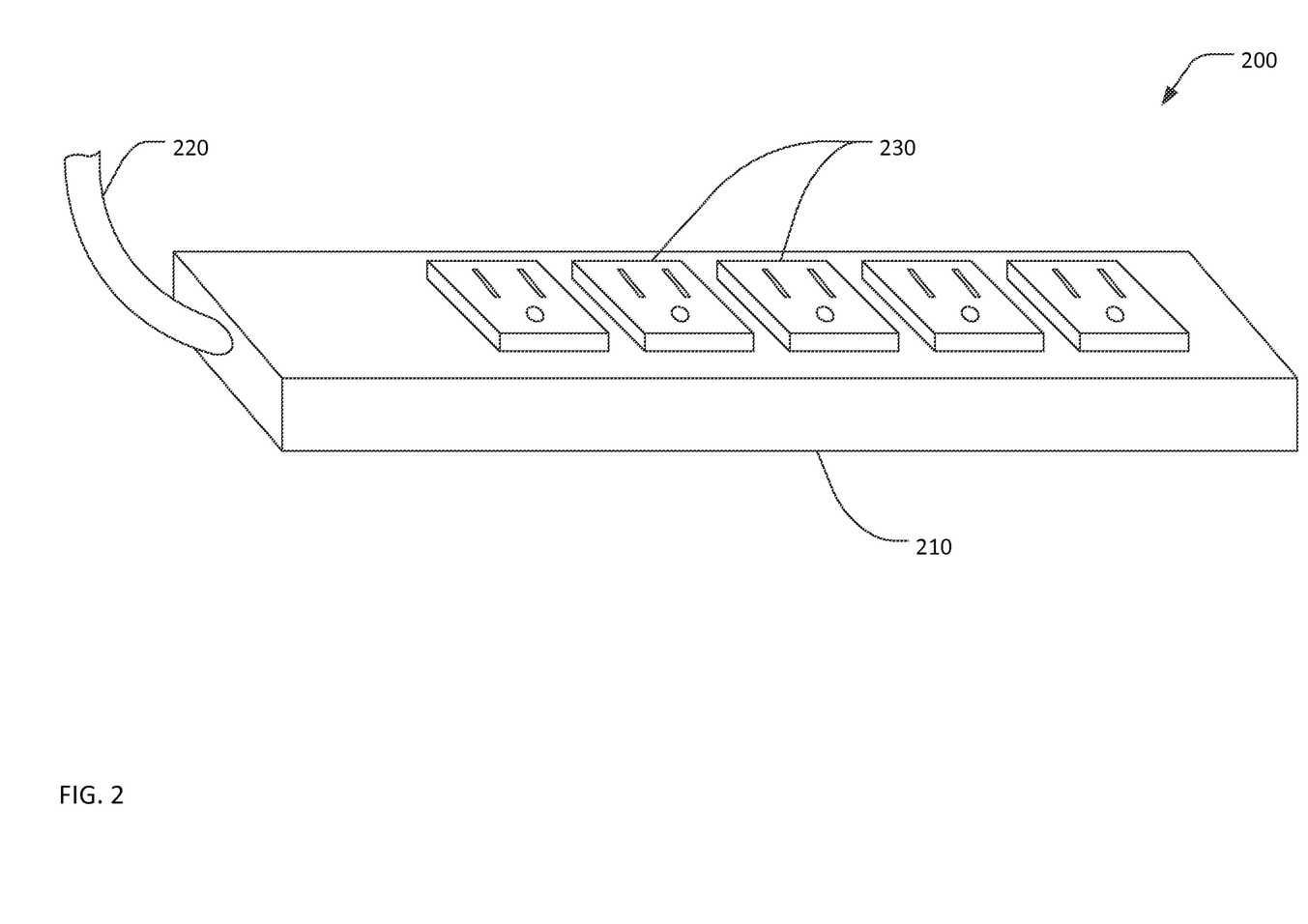
FIG. 2 is a perspective view of an exemplary PLC zoning device.

Referring now to FIG. 2, a PLC zoning device 200, which may be the PLC zoning device 100, may include a housing 210 supporting multiple power outlets 230 and a power cord 220. In short, the PLC zoning device 200 may closely resemble a conventional multiple outlet extension cord. The PLC zoning device 200 may have other features, not shown in FIG. 2, such as an on/off switch, a "power on" light, and/or a circuit breaker, that are also commonly found on conventional multiple outlet extension cords.

Figure 3:
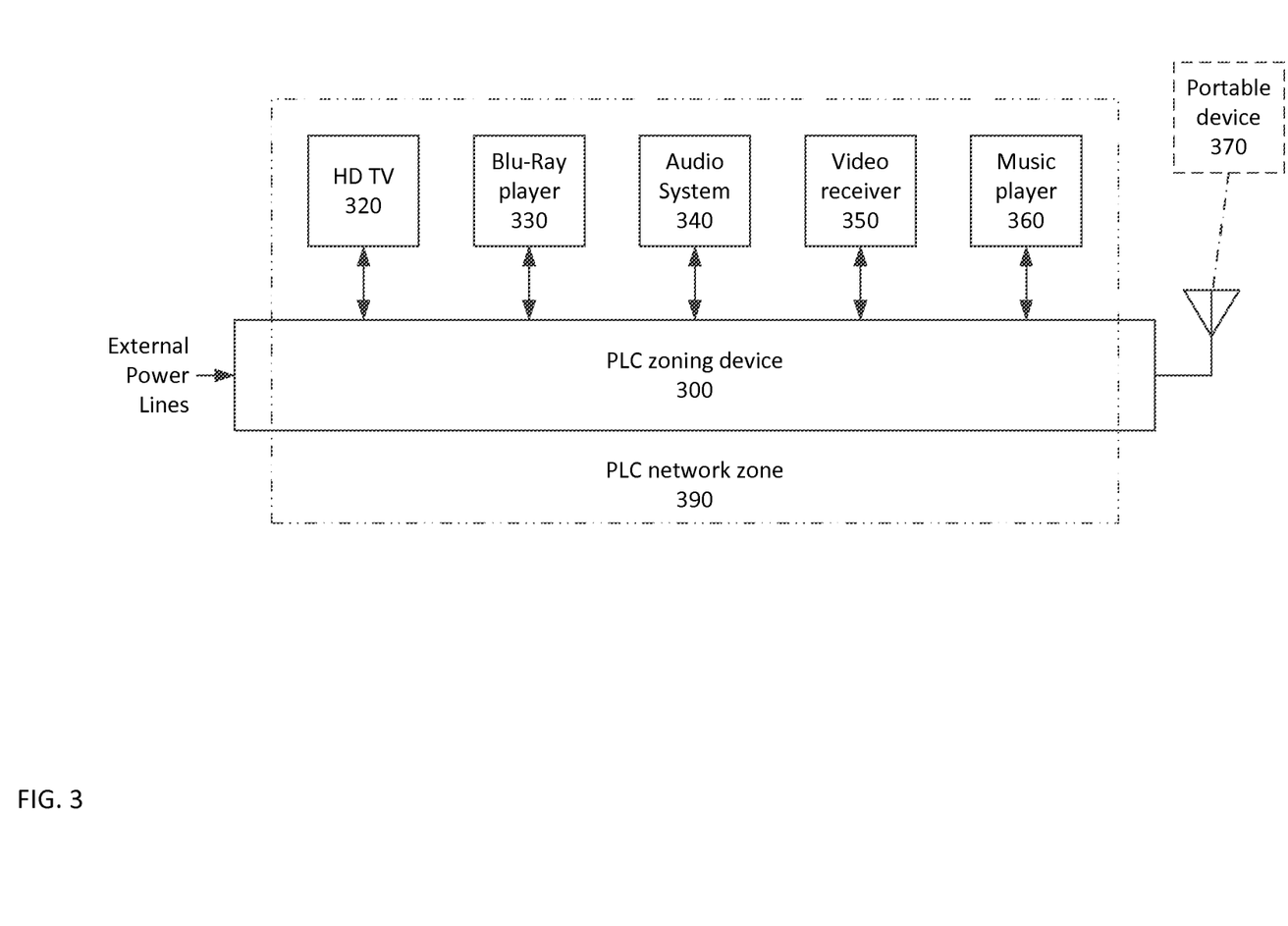
FIG. 3 is a block diagram of an environment for a PLC zoning device.

Referring now to FIG. 3, an exemplary PLC network zone 390 may include a PLC zoning device 300, which may be the PLC zoning device 100, and a complement of devices for a home entertainment center. These devices may include a high definition television (320), a Blu-Ray® player (330) or other high definition optical disc player, an audio system 340 including a multichannel amplifier and a complement of speakers; a television or cable video receiver (350), a music player 360, and/or other audio or video equipment. Audio and video information may be communicated between the various devices of the home entertainment system via the PLC network zone 390 without requiring any cables other than the equipment power cords. When the PLC zoning device 300 includes an interface to a wireless LAN, one or more portable devices 370 may also be connected to the home entertainment equipment.

Figure 4A:
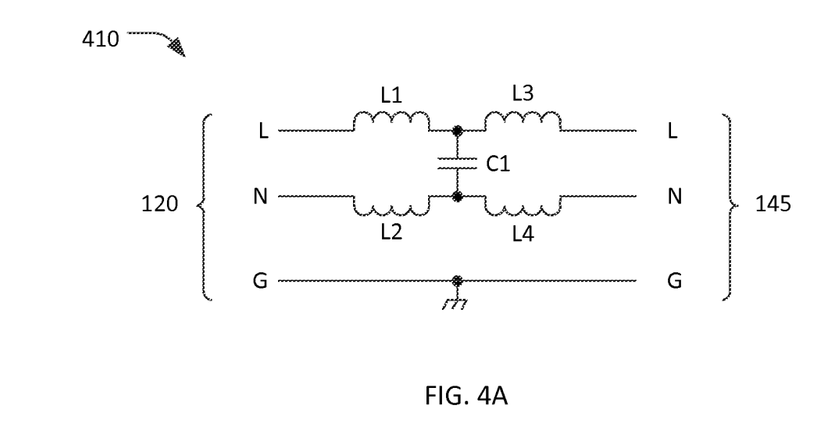
FIG. 4A is a schematic diagram of an exemplary isolation device.

FIG. 4A is a schematic diagram of an exemplary low pass filter 410 that may be suitable for use in an isolation device in a PLC zoning device, such as the isolation device 140 in the PLC zoning device 100. The low pass filter 410 may be configured to allow power to flow from the power cord 120 to the internal power lines 145 with low loss while preventing, or at least strongly attenuating, PLC communications signals passing between the power cord 120 and the internal power lines 145. The low pass filter 410 may include four inductors L1-L4 and a capacitor C1. Each of the inductors L1-L4 may be selected to have low impedance at the power line frequency (50 or 60 Hz) and high impedance at the PLC communications frequencies, which may include frequencies from 50 KHz to 200 MHz or higher. Conversely, the capacitor C1 may be selected to have high impedance at the power line frequency (50 or 60 Hz) and low impedance at the PLC communications frequencies. A low pass may have a different architecture and more or fewer components than the low pass filter 410. An isolation device may include a band-pass, a band-reject filter, or another type of filter instead of, or in addition to, a low pass filter.

The low pass filter 410 may be suitable for use as the isolation device in PLC zoning devices for use with PLC communications standards that convey communications signals on only the line L and neutral N conductors of the power cord 120. Low pass filters for use with PLC communications standards that convey communications signals on the ground G conductor may have additional components.

Figure 4B:
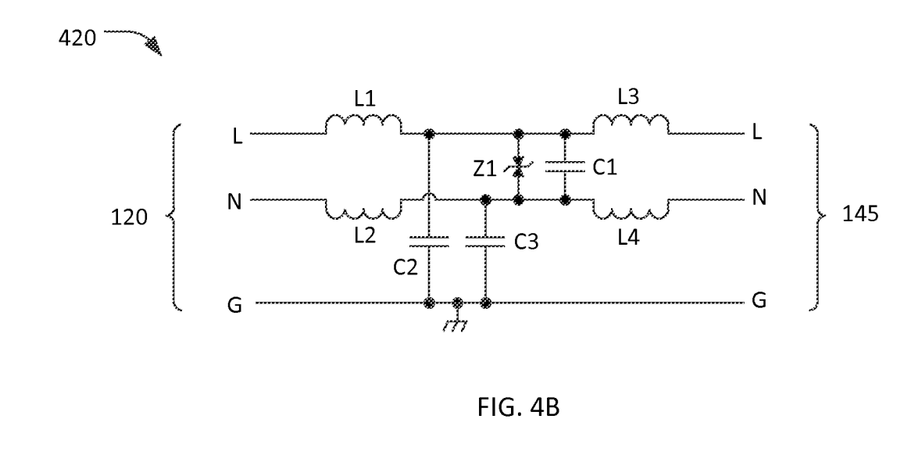
FIG. 4B is a schematic diagram of an exemplary isolation device and surge suppressor.

FIG. 4B is a schematic diagram of an exemplary isolation device and surge suppressor 420 that may be suitable for use in a PLC zoning device, such as the PLC zoning device 100. The isolation device and surge suppressor 420 may be configured to allow power to flow from the power cord 120 to the internal power lines 145 with low loss while preventing, or at least strongly attenuating, PLC communications signals passing between the power cord 120 and the internal power lines 145, and while protecting devices (not shown) connected to the internal power lines 145 from transients and surges that may appear on the power cord 120. The isolation device and surge suppressor 420 may have a similar architecture and similar components to the low pass filter 410, with the addition of at least one surge suppression device. The isolation device and surge suppressor 420 may also include additional capacitors C2 and C3. In the example of FIG. 4B, the surge suppression device is shown as a metal oxide varistor Z1. Other types of surge suppression devices, including transient suppression diodes and/or gas discharge tubes, may be used. An isolation device and surge suppressor may have a different architecture and more or fewer components than the isolation device and surge suppressor 420.

Figure 5:
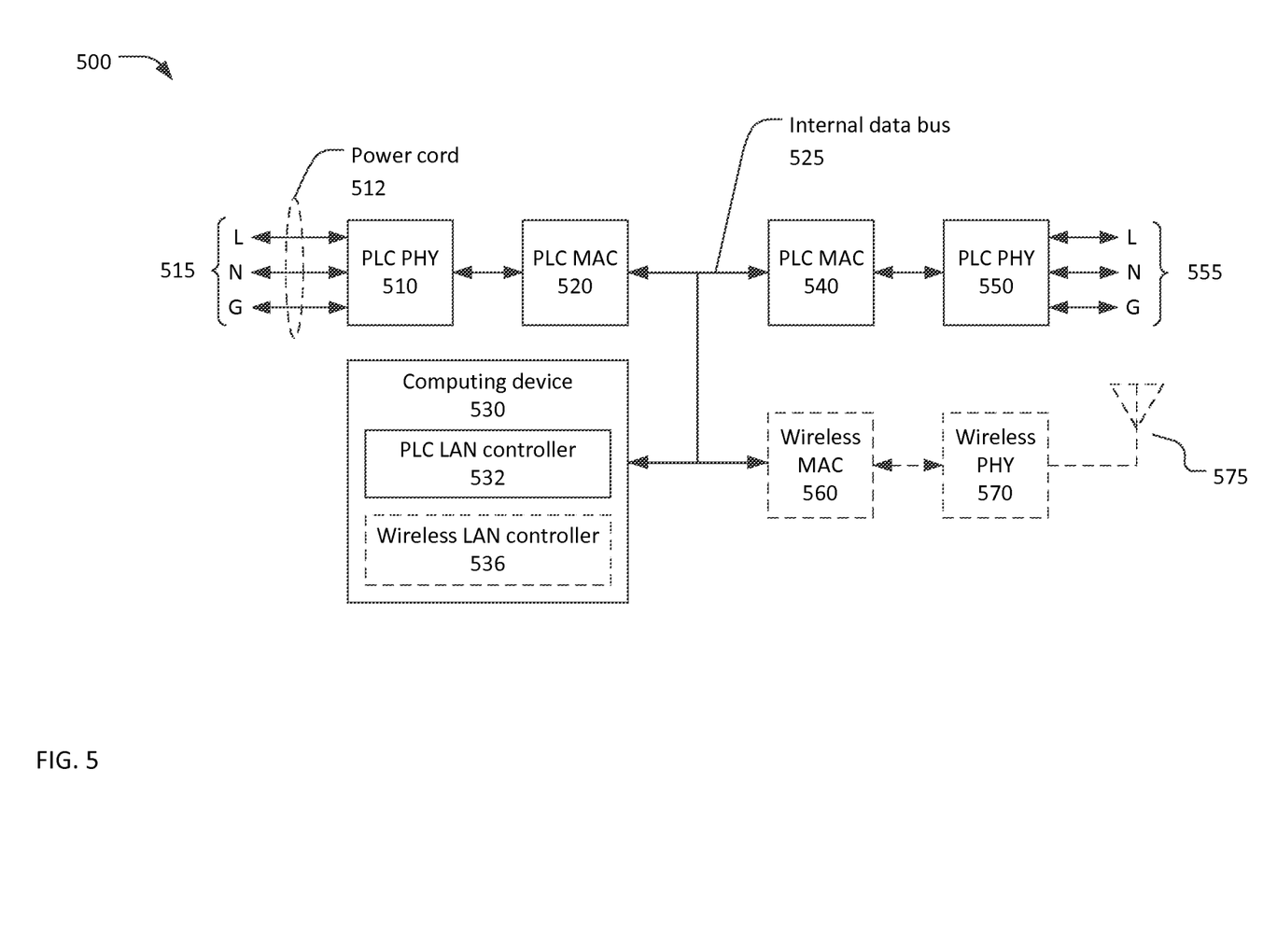
FIG. 5 is a block diagram of a bypass device.

Referring now to FIG. 5, a bypass device 500 may be suitable for use as the bypass device 150 in the PLC zoning device 100. Functionally, the bypass device 500 may include a first PLC physical interface (PHY) 510 coupled to a power cord 512 and external power lines 515, and a second PLC PHY 550 coupled to a set of internal power lines 545. In this patent, the term "coupled" means "connected to and in communications with".

The first PLC PHY 510, the power cord 512, and the external power lines 515 may collectively form the physical layer of a first communications network using a first PLC communications protocol. In this context, the term "physical layer" encompasses both a communications protocol layer and the physical hardware used for communications. Similarly, the second PLC PHY 550, the internal power lines 555, and devices (not shown) connected to the internal power lines may collectively form the physical layer of a second communications network using a second PLC communications protocol. The second PLC communications protocol may be the same as or different from the first PLC communications protocol.

Medium Access Control is a sublayer of the Data Link Layer within the OSI seven-layer model. The acronym "MAC" is commonly used to describe both the processes of the Medium Access Control sublayer and the media access controller (i.e. the hardware/software/firmware) that implements those processes. The first PLC PHY 510 may be coupled to a first PLC medium access controller (MAC) 520. The second PLC PHY 550 may be coupled a second PLC MAC 540. The first and second PLC MACs 520, 540 may be coupled to each other and to a computing device 530 via an internal data bus 525.

The first PLC PHY 510 and the second PLC PHY 550 may extract received communications signals from the respective power lines and translate the communications signals into digital data in a format suitable for processing by the respective MAC. The first PLC PHY 510 and the second PLC PHY 550 may also accept digital data from the respective MAC and translate the digital data into communications signals for transmission over the respective power lines. Functions performed by the first PLC PHY 510 and the second PLC PHY 550 may include isolation from the high voltages present on the power lines, analog-digital/digital-analog conversion, and serialization/deserialization of the digital data (i.e. conversion between serial bit streams conveyed over the power lines and parallel data words processed by the MACs). Where required by the PLC protocols used on the power cord 512 and the internal power lines 555, the first PLC PHY 510 and/or the second PLC PHY 550 may perform other functions such as coding, clock recovery, interleaving, frame synchronization, flow control, carrier sensing, collision detecting, error detection and/or correction, filtering, equalization and other signal processing functions.

The first PLC MAC 520 may provide addressing and medium access control mechanisms for the first communications network. The second PLC MAC 540 may provide addressing and medium access control mechanisms for the second communications network.

The computing device 530 and the second PLC MAC 540 may collectively accumulate an inventory of devices in the second communications network (i.e. devices connected to the internal power lines 555). The inventory of connected devices may include address information, such as a MAC address and/or an IP Address, for each connected device. The inventory of connected devices may be accumulated, for example, by running a discovery process upon power-up and/or periodically. The inventory of connected devices may be accumulated by monitoring communications traffic on the internal power lines 555. The computing device 530 and the second PLC MAC 540 may accumulate the inventory of connected devices in some other manner. In some situations, the second communications network may be controlled by a device, other than the bypass device 500, connected to the internal power lines 555. In this case, the device serving as the network controller may discover the devices connected to the second communication network and provide the inventory of connected devices to the bypass device 500.

The second PLC MAC 540 may monitor communications traffic on the second communications network. When the second PLC MAC 540 detects communications traffic destined for devices that are not part of the second communications network (i.e. devices not included in the inventory of connected devices), the second PLC MAC 540 may forward the communications traffic to the first PLC MAC 520 for transmission over the first communications network. The traffic may be forwarded from the second PLC MAC 540 to the first PLC MAC 520 directly over the internal data bus 525. Traffic being forwarded may be stored and/or processed by the computing device 530 prior to forwarding to the first PLC MAC 520.

The inventory of connected devices may be accessible to the first PLC MAC 520. The first PLC MAC 520 may monitor communications traffic on the first communications network. When the first PLC MAC 520 detects communications traffic destined for devices that are part of the second communications network (i.e. devices included in the inventory of connected devices), the first PLC MAC 520 may forward the communications traffic to the second PLC MAC 540 for transmission over the second communications network. The traffic may be forwarded from the first PLC MAC 520 to the second PLC MAC 540 directly over the internal data bus 525. Traffic being forwarded may be stored and/or processed by the computing device 530 prior to forwarding to the second PLC MAC 540.

The bypass device 500 may function as a network controller or administrator for the second communications network or both the first and second communications network. To this end, the computing device 530 may execute a PLC LAN controller program 532. A primary function of a network controller may be bandwidth allocation among the devices connected to the PLC network. Bandwidth allocation involves both determining what portion of the time each device will be given the exclusive right to transmit over the network, and notifying each device when to start transmitting. Depending on the PLC protocol used on the PLC communications networks, the network controller may either periodically transmit a schedule for the other device on the network, or may individually notify each station to start transmitting.

The bypass device 500 may optionally include a wireless MAC 560 and a wireless PHY 570 for communicating with a wireless local area network via one or more antenna 575. The wireless network may be, for example, a Wi-Fi® network. Communications traffic from the wireless local area network destined for devices on the second communications network may be forwarded from the wireless MAC 560 to the second PLC MAC 540. Communications traffic from the wireless local area network destined for devices not on either the wireless LAN or the second communications network may be forwarded from the wireless MAC 560 to the first PLC MAC 520. Communications traffic may flow in the reverse direction from the first communications network and/or the second communications network to the wireless LAN.

The bypass device may function as a controller or administrator for the wireless LAN, such that the PLC network zoning device is also an access point for the wireless LAN. To this end, the computing device 530 may execute a wireless LAN controller program 534.

The depiction in FIG. 5 of the bypass device as a set of functional elements does not imply any corresponding physical separation or demarcation. All or portions of one or more functional element, may be collocated within a common programmable circuit device or application specific integrated circuit. Any of the functional elements may be divided between two or more circuit devices. The computing device 530 may include memory and a processor executing stored software instructions. The first PLC MAC 520 and the second PLC MAC 540 may be implemented in hardware or by a combination of hardware and software executed by one or more processors. The first PLC MAC 520 and the second PLC MAC 540 may be implemented wholly or in part by software executed by the computing device 530. The first PLC PHY 510 and the second PLC PHY 550 may be implemented primarily in hardware, which may be augmented by software and/or firmware. Digital baseband portions of the first PLC PHY 510 and the second PLC PHY 550 may be implemented in a common integrated circuit chip, which may also include all or portions of the first PLC MAC 520 and the second PLC MAC 540. The "digital baseband portions" may exclude analog and RF circuits and components required to couple digital information onto the respective communications medium.

Figure 6:
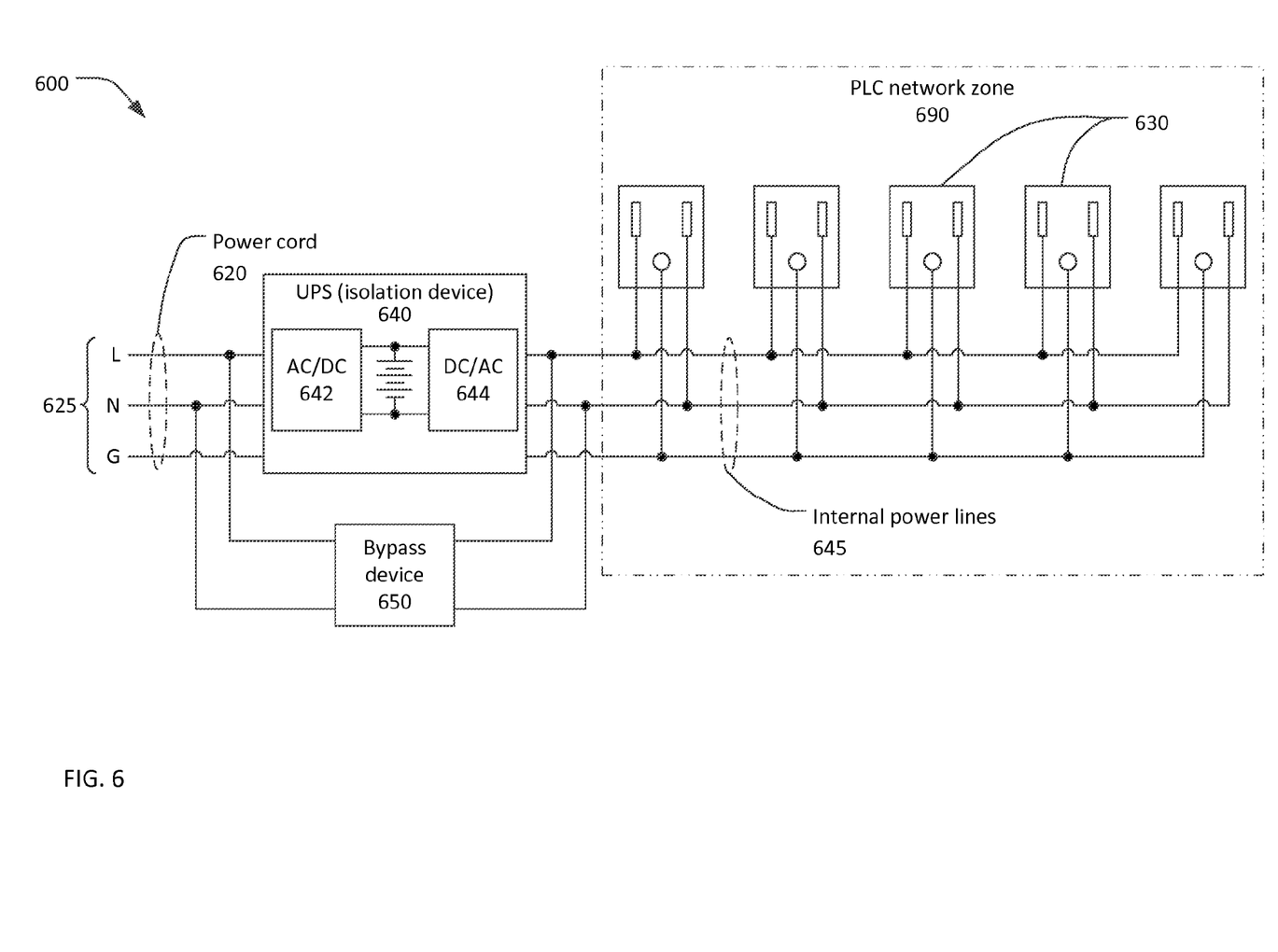
FIG. 6 is a block diagram of another PLC zoning device.

Referring now to FIG. 6, another PLC zoning device 600 may include an uninterruptable power source (UPS) 640 that also serves as an isolation device. The UPS may receive AC power from external power lines 625 via power cord 620. The UPS may include an AC/DC converter 642 to convert the AC power into DC power that is stored in a battery. The UPS may include a DC/AC converter 644 to convert DC power from the battery into AC power to power devices connected to internal power lines 645 via multiple power outlets 630.

The UPS 640 may block higher frequency PLC communications signals from passing between the power cord 620 and the internal power lines 645. The internal power lines 645, the power outlets 630, and devices (not shown) connected to the power outlets 630 form an isolated PLC network zone 690.

A bypass device 650 may allow selective communications between devices in the PLC network zone 690 and devices external to the PLC network zone 690 as previously described with respect to the bypass device 150 of FIG. 1.

Figure 7:
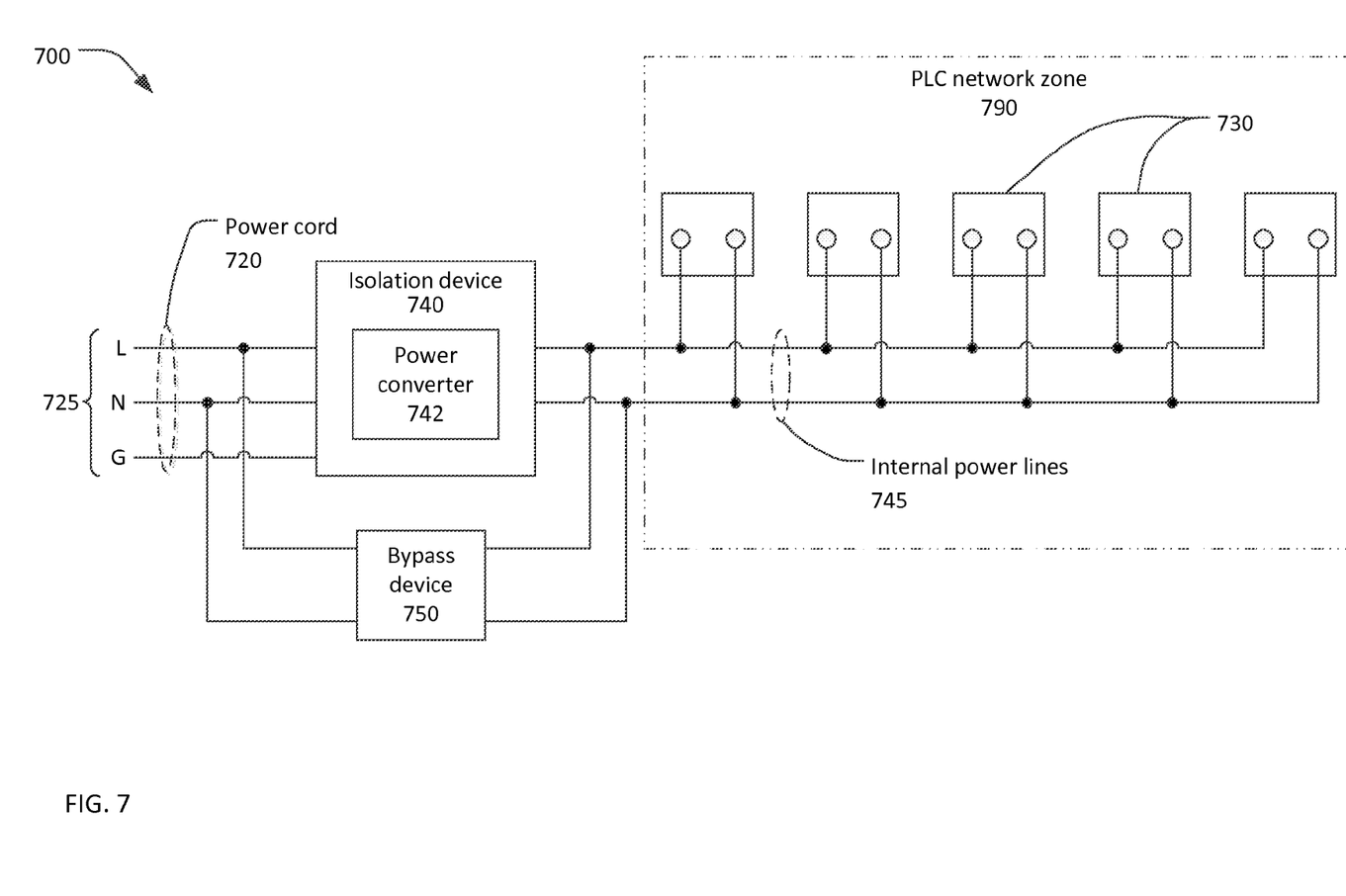
FIG. 7 is a block diagram of another PLC zoning device.

Referring now to FIG. 7, another PLC zoning device 700 may include an isolation device 740 comprising an AC-DC or DC-DC power converter 742. The isolation device may receive AC power from external power lines 725 via power cord 720. The isolation device 740 may output DC power on internal power lines 745. One or more device (not shown) may receive DC power via power outlets 730. The power outlets 740 may be connectors, as shown, or individual power cords, or a combination of connectors and power cords.

The isolation device 740 may block higher frequency PLC communications signals from passing between the power cord 720 and the internal power lines 745. The internal power lines 745, the power outlets 730, and the one or more devices (not shown) connected to the power outlets 730 form an isolated PLC network zone 790.

A bypass device 750 may allow selective communications between devices in the isolated PLC network zone 790 and devices external to the PLC network zone 790 as previously described with respect to the bypass device 150 of FIG. 1.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A power line communications (PLC) network zoning device, comprising:
    a housing;
    a power cord extending from the housing;
    a plurality of power outlets mounted on the housing, the plurality of power outlets coupled to internal power lines within the housing;
    an isolation device disposed within the housing, the isolation device configured to transmit electrical power from the power cord to the internal power lines while isolating PLC communications traffic on the internal power lines from PLC communications traffic on the power cord; and
    a bypass device disposed within the housing, the bypass device configured to:
        identify devices connected to the plurality of power outlets,
        identify network traffic arriving on the power cord addressed to any of the devices connected to one of the plurality of power outlets, and
        transfer the identified traffic from the power cord to the internal power lines bypassing the isolation device.

2. The PLC network zoning device of claim 1, wherein the isolation device comprises a filter configured to transmit low frequency electrical power and to block high frequency PLC communications signals.

3. The PLC network zoning device of claim 1, wherein the isolation device comprises a filter configured to block all frequencies other than direct current.

4. The PLC network zoning device of claim 1, wherein the isolation device comprises an uninterruptable power system.

5. The PLC network zoning device of claim 1, wherein the bypass device is configured to control a local area network formed by the internal power lines and one or more devices connected to the power outlets.

6. The PLC network zoning device of claim 1, configured to serve as an access point for a wireless local area network.

7. The PLC network zoning device of claim 1, wherein the bypass device is further configured to
    identify network traffic on the internal power lines addressed to any device other than the devices connected to the plurality of power outlets, and
    transfer the identified traffic from the internal power lines to the power cord.

* * * * *